United States Patent [19]

Loyd, Jr.

[11] 4,135,485
[45] Jan. 23, 1979

[54] SPLIT-MULTI-UNIT ROTARY COMBUSTION ENGINE

[75] Inventor: Robert W. Loyd, Jr., Wyckoff, N.J.

[73] Assignee: Curtiss-Wright Corporation, Wood-Ridge, N.J.

[21] Appl. No.: 808,667

[22] Filed: Jun. 21, 1977

[51] Int. Cl.² .............................................. F02B 53/00
[52] U.S. Cl. .............................. 123/242; 123/122 AB; 123/198 F; 123/220
[58] Field of Search ................ 123/216, 242, 122 AB, 123/198 F, 220

[56] References Cited

U.S. PATENT DOCUMENTS

| 2,114,655 | 4/1938 | Leibing | 123/198 F X |
| 3,514,235 | 5/1970 | Yamauchi | 123/242 X |
| 3,809,019 | 5/1974 | Stoltman | 123/122 AB X |
| 4,070,994 | 1/1978 | Garabedian | 123/242 |

Primary Examiner—Carlton R. Croyle
Assistant Examiner—Michael Koczo, Jr.
Attorney, Agent, or Firm—Arthur Frederick; Victor D. Behn

[57] ABSTRACT

A multi-unit rotary combustion engine in which at light loads the engine can be operated on only some of the units with those units having side intake ports and with the other units having peripheral intake ports.

10 Claims, 4 Drawing Figures

SPLIT-MULTI-UNIT ROTARY COMBUSTION ENGINE

BACKGROUND OF INVENTION

The invention relates to rotary combustion engines, particularly to the type of rotary engine shown in U.S. Pat. No. 2,988,065 granted on June 13, 1961 to Wankel et al. Multi-unit engines of this type having a plurality of rotors journaled on a common shaft are also known. U.S. Pat. No. 3,077,867 granted Feb. 19, 1963 to Froede and U.S. Pat. No. 3,062,435 granted Nov. 6, 1962 to Bentele and U.S. Pat. No. 3,240,423 granted Mar. 15, 1966 to Jones, are examples of such prior art multi-unit rotary engines.

In the case of engines used to power automobiles, during a major portion of the time of engine operation, such an engine is operating at only part load which, in general, is even substantially less than half of maximum power operation. The efficiency of a combustion engine is substantially less at part load operation as compared to full load operation. Accordingly, when powering an automobile a combustion engine is operating at substantially less than maximum efficiency during a major portion of the time.

SUMMARY OF THE INVENTION

It is an object of this invention to provide a multi-unit rotary combustion engine which can be operated on less than all the units when the engine is operating at low loads. In this way when the engine is operating at a low load, this load is carried by less than all the engine units and therefore the engine unit or units which are providing power are operating under a higher load and therefore at higher efficiency than they would be if the power were divided between all the units.

In reciprocating piston-type engines, it is well known to operate the engine on less than all the engine cylinders when the engine is operating at low loads, for example, during idle and cruise operation. U.S. Pat. No. 2,166,968 granted July 25, 1939 to Rohlin; U.S. Pat. No. 2,247,299 granted June 24, 1941 to Klavik and U.S. Pat. No. 3,765,394 granted Oct. 16, 1973 to Francis are examples of such prior art reciprocating engine patents. Such engines have been referred to as "split engines".

In the case of rotary combustion engines it is known to provide the engine with either a side intake port or a peripheral intake port. Side intake ports for rotary engines have the advantage in that the engine operates smoother during idling and low power operation than rotary engines having peripheral intake ports. On the other hand, rotary engines with peripheral intake ports can take in a greater charge and therefore operate at higher power than a similar size engine having a side intake port.

Accordingly, it is a further object of the invention to provide a split multi-unit rotary engine in which during idle and low power engine operation, one or more of the units furnish no power while at higher engine powers all the engine units contribute to the power and in which the unit or units operating at low power have side intake ports and the other unit or units have peripheral intake ports.

Another object of the invention resides in the provision of valve means for a multi-unit rotary engine which at low engine powers can be moved to a position for closing the intake passage for admitting a charge to at least one of the engine units so as to shut said unit down whereby at low powers the entire power output of the multi-unit rotary engine is delivered by only a portion of the engine units. Automatic means may be provided for controlling said valve means in response to a condition of the engine indicative of its power output. For example, the position of the engine throttle valve, the intake manifold pressure, engine coolant temperature and/or engine rotative speed could provide a signal of such an engine condition to a control unit for automatically actuating valve means to shut down portions of the engine during low power operation.

In order to further improve the low power operation of the engine, the engine unit or units delivering power at low power operation of the engine could be provided with a heater for the intake manifold of this unit or units to help vaporize the fuel to said units thereby further improving their combustion efficiency during the low power operation. The engine exhaust gases could be used for this purpose by passing at least a portion of these gases through a heater surrounding the intake manifold for the engine unit or units at low power. The addition of such a heater to heat the intake charge for the engine units operating during low power operation results in an improvement in the vaporization of the fuel and in a reduction in the density of the intake charge for said units thereby resulting in better mixing of the fuel and air to these engine units and improving their combustion efficiency at low power. Preferably, the intake charge for the high power engine would not be so heated so as to maintain the highest available density of air for these units thereby maximizing the power available from these units. As a result, the addition of such a heater improves fuel economy without materially reducing the available power output of the engine. Furthermore, it is within the scope of the invention to deactivate said intake charge heater when the engine is operating at high power outputs.

Other objects of the invention will become apparent upon reading the following detailed description in connection with the drawings.

DESCRIPTION OF PREFERRED EMBODIMENTS

Figure 1:
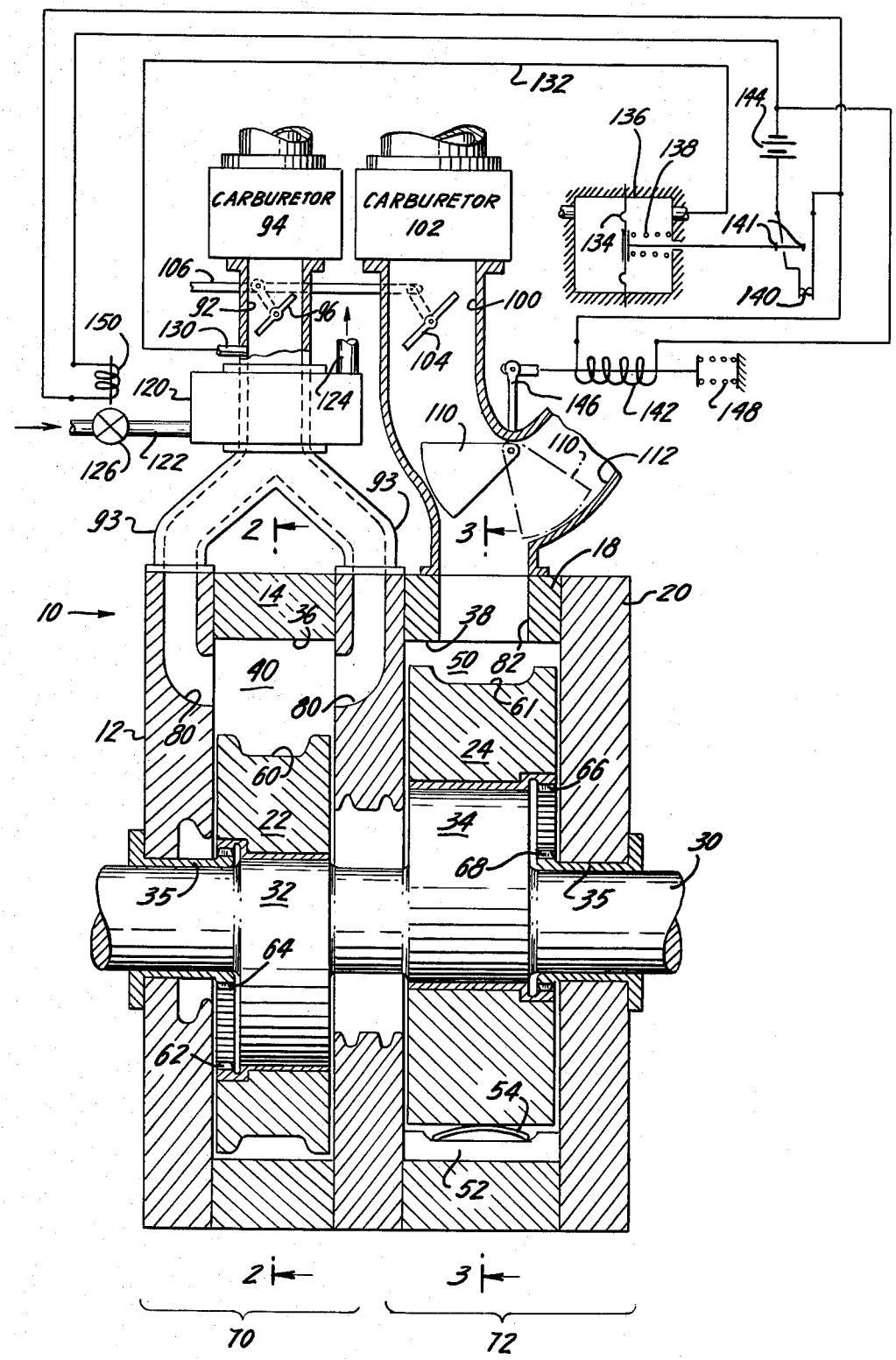
FIG. 1 is an axial sectional view through a multi-unit rotary engine embodying the invention and taken along line 1—1 of FIG. 2.
Figure 2:
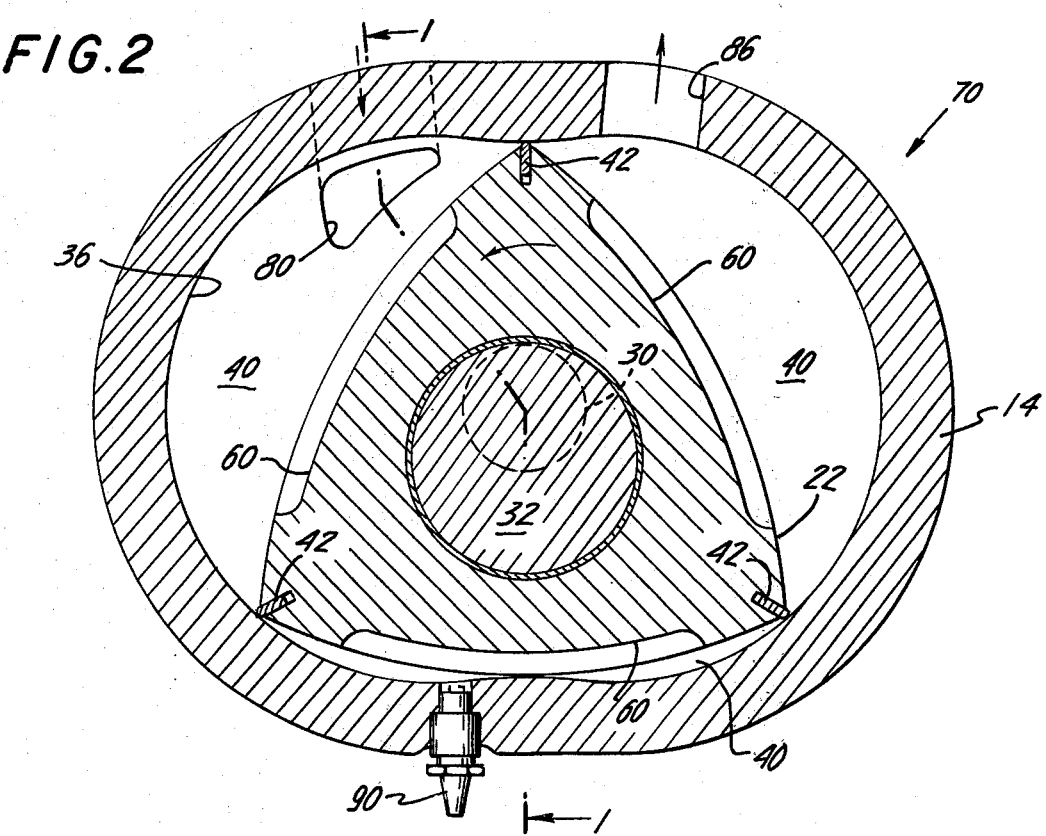
FIGS. 2 and 3 are sectional views taken along lines 2—2 and 3—3 of FIG. 1.
Figure 3:
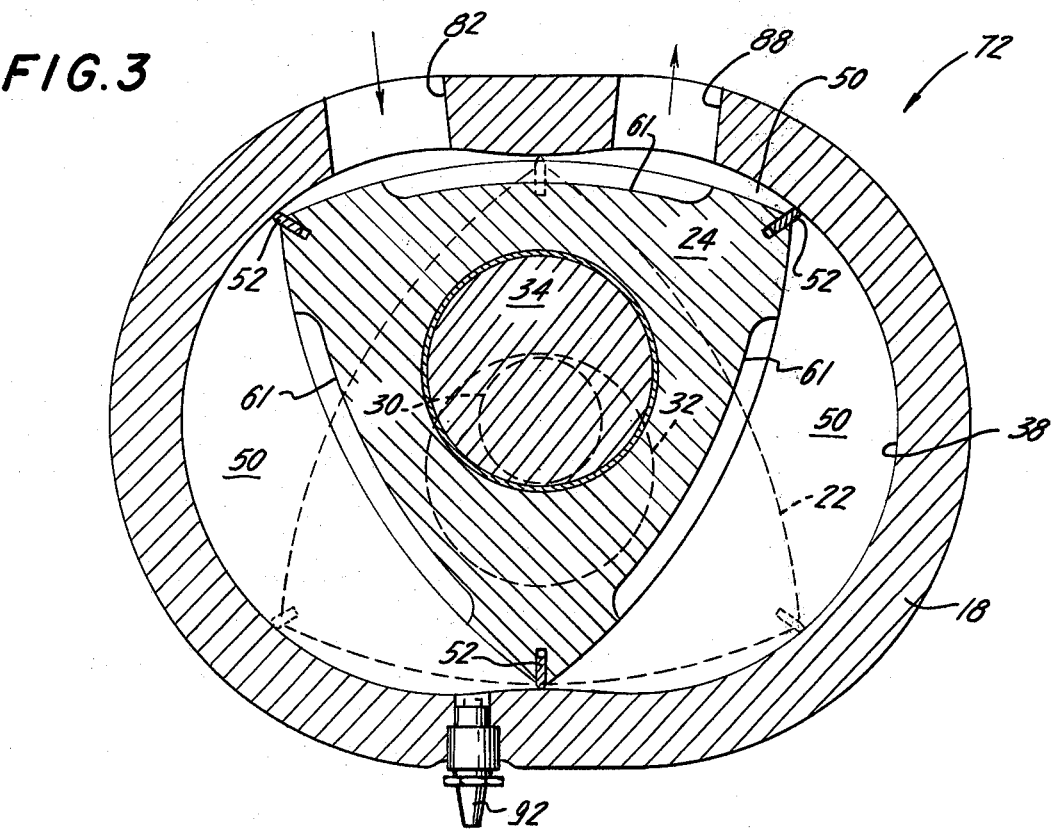

Referring first to FIGS. 1 and 2 of the drawing, a multi-unit rotary engine 10 is shown as having an outer body or housing consisting of an end housing section 12, a rotor or peripheral housing section 14, an intermediate housing section 16, a second rotor or peripheral housing section 18 and a second end housing section 20. These housing sections are coaxially disposed and are secured together (as by bolts, not shown) to form a rigid engine housing. The end housing section 12 and intermediate housing section 16 are spaced apart by the rotor housing section 14 to form an engine cavity within which an engine rotor or inner body 22 is mounted. Similarly, the intermediate housing section 16 and end housing section 20 are spaced apart by the rotor housing 18 to form a second engine cavity within which a second engine rotor or inner body 24 is mounted.

A shaft 30 extends coaxially through the engine housing and is supported by bearings 35 in the end housing 12 and 20. A bearing (not shown) may also be provided between the shaft and the intermediate housing section 16. For this purpose a split bearing may be provided as in the aforementioned patent to Bentele or the shaft may have a multi-part construction as in the aforementioned patent to Jones. As shown, the shaft 30 has a pair of cylindrical eccentric portions, 32 and 24, each disposed in one of the engine cavities and on which the engine rotors 22 and 24 are journaled. For reasons of balance, the rotor eccentric portions preferably are 180° out of phase as shown in the drawing.

The inner peripheral surfaces 36 and 38 of the rotor housing sections 14 and 18 respectively have a multi-lobe profile which preferably is substantially an epitrochoid. The outer peripheral surface of each rotor 22 and 24 preferably is substantially the outer envelope of its respective trochoidal surface 36 and 38. As illustrated, each trochoidal surface 36 and 38 has two lobes and the peripheral surface of each rotor 22 and 24 has three apex portions.

Each of the apex portions of the rotor 22 has sealing cooperation with its associated trochoidal surface 36 to form a plurality of working chambers 40 between the rotor 22 and the trochoid surface 36. As illustrated, the rotor 22 has three apex portions and as a result three working chambers 40 are formed between the peripheral surface of the rotor 22 and the trochoidal surface 36. For sealing these working chambers 40, each of the apex portions of the rotor 22 preferably is provided with radially-movable seal means 42 which extends axially across the rotor 22 and is urged radially into sealing engagement with the trochoidal surface 36 by suitable spring means (not shown for the seals 42). Seal means (not shown) preferably is also provided between the sides of the rotor 22 and the adjacent walls 12 and 16 so as to complete the seal grid around each working chamber 40. Suitable rotor side seals for this purpose are disclosed in the aforementioned patents to Wankel et al, Bentele, Jones and Froede.

Similarly each of the apex portions of the rotor 24 has sealing cooperation with its associated trochoidal surface 38 to form a plurality of working chambers 50 between the rotor 24 and the trochoidal surface 38. Since the rotor 24 also has three apex portions, three working chambers 50 are so formed. For sealing these working chambers 50, each apex portion of the rotor 24 preferably is provided with radially movable seal means 52 extending axially across the rotor 24 and urged radially into sealing engagement with the trochoidal surface 38 by suitable spring means 54. As in the case of the rotor 22, suitable seal means preferably is provided in-between the sides of the rotor 24 and the adjacent walls 16 and 20 to complete the seal grid around the working chamber 50.

As is conventional in such rotary engines, the rotors 22 and 24 preferably are provided with a trough-like recess 60 and 61 respectively on each of their peripheral faces between an adjacent pair of their apex seals. Also, suitable timing gears 62 and 64 are secured to the engine rotor 22 and housing respectively and a similar pair of timing gears 66 and 68 are secured to the engine rotor 24 and housing respectively, said gears control relative rotation of their respective rotors. For an engine having a housing with a two-lobe trochoidal surface with rotor having three apex portions as illustrated, the timing gears 62 and 64 and the gears 66 and 68 have a gear ratio of 3:2.

The structure so far described is that of a conventional two unit rotary engine. One of the engine units consists of the rotor 22 and associated structure and is identified by the reference numeral 70 and the other engine unit consists of the rotor 24 and associated structure and is identified by the reference numeral 72. It is noted that the housing section 16 forms a common intermediate housing section for the two engine units so that this intermediate housing section forms one of the side walls for the engine unit 70 and also forms one of the side walls for the engine unit 72.

In accordance with the invention, one of the engine units is provided with an intake port in at least one of its side housing walls and the other unit is provided with an intake port in its rotor housing. Thus, as illustrated, the engine unit 70 has intake ports 80 in each of its side walls 12 and 16 while the engine unit 72 has its intake port 82 in the peripheral trochoidal surface of the rotor housing 18. Each engine unit is also provided with an exhaust port, the engine unit 70 having an exhaust port 86 and the engine unit 72 having an exhaust port 88. Where the engine is to be spark-ignited, a spark plug is provided for each engine unit. As shown in FIG. 2, a spark plug 90 is mounted on the rotor housing 14 for the engine unit 70 on the side of said housing generally diametrically opposed to the inlet and outlet ports. Similarly, a spark plug 92 is mounted on the rotor housing 16 for the engine unit 72.

The engine unit 70 includes an intake passage 92, this passage being bifurcated as shown at 93 with its two branches 93 leading to the two side intake ports 80. The intake passage 92 includes a carburetor 94 for supplying a fuel-air mixture to the side intake ports 80 and said passage includes a throttle valve 96 for controlling the supply of this mixture to regulate the power output of the engine unit 70.

The engine unit 72 includes an intake passage 100 leading to the peripheral intake port 82. The intake passage 100 is provided with a carburetor 102 for supplying a fuel-air mixture to the peripheral intake port 82, said intake passage including a throttle valve 104. The throttle valves 96 and 104 may be independently controlled or, as illustrated in FIG. 1, they may be interconnected to a common linkage 106 for actuation of said valves.

The intake passage 100 for the engine unit 72 also includes a second valve 110 which, in the full line position shown in FIG. 1, closes the intake passage 100. Accordingly, when the valve 110 is in this full line position, no fuel-air mixture is supplied to the engine unit 72 and therefore at this time the engine unit 72 produces no power and, in effect, is shut down. Therefore, when the valve 110 is in its full line position, all the engine power is provided by the single engine unit 70.

The intake passage 100 for the engine unit 72 preferably is provided with a by-pass passage 112 so that when the valve 110 is in its full line position, the intake port 82 for the engine unit 72 is connected directly to the atmosphere. When, however, the valve 110 is in its dot-and-dash line position of FIG. 1, the by-pass passage 112 is closed and the intake passage 100 is open and, therefore, the engine unit now delivers power under the control of its throttle valve 104.

With the structure of the engine 10 so far described and with the valve 110 in its dot-and-dash line position of FIG. 1, both engine units 70 and 72 are supplied with a fuel-air mixture through their intake ports 80 and 82 respectively. Hence, as the engine operates, the working chambers 40 of the engine unit 70 are sequentially provided with a combustible mixture and likewise the working chambers 50 of the engine unit 72 are sequentially provided with a combustible mixture. Accordingly, with the valve 110 in this dot-and-dash line position, the two unit rotary engine operates in the normal manner of a multi-unit rotary engine with the working chambers 40 of the engine unit 70 and the working chambers 50 of the engine unit 72 all contributing to the engine power output.

When, however, the throttle valves 96 and 104 are all moved to a position for low power output, it is more efficient to supply this power output from only one of the two engine units 70 and 72. For this purpose, the valve 110 is then moved to its full-line position of FIG. 1. In this position of the valve 110, the intake passage 100 for the engine unit 72 is closed and therefore all the power output of the engine is now supplied by the engine unit 70. This means that the engine unit 70 is operating at a substantially greater efficiency than it would be if the low power output were divided between the two engine units. When the valve 110 is in its full line position, it may, as illustrated, also have the further function of opening the intake port 82 for the engine unit 72 to the atmosphere. As a result, the engine unit 72 will now serve to pump air through its working chambers 50 into the engine exhaust thereby diluting the engine exhaust and helping to burn any unburnt fuel present in the engine exhaust.

The valve 110 preferably has the fan-shaped, cross-section illustrated in order that as the valve moves from its full line position to its dot-and-dash line position, the intake passage 100 remains closed by the valve until the valve has moved sufficiently far to close the by-pass passage 112.

The combustion efficiency of the unit 70 at low power operation can be further increased by adding a heater 120 to the intake manifold 92 for the engine unit 70. Such a heater would serve to help vaporize the fuel thereby increasing the combustion efficiency. The heat for the heater 120 may be obtained by by-passing at least a portion of the engine exhaust gases through the heater in heat exchange relation with the intake manifold 92. Thus, as illustrated, the heater may be provided with inlet and outlet passages 122 and 124 respectively for engine exhaust gases.

The heater 120 has the effect of improving the vaporization of the fuel and of reducing the density of the charge taken into the working chambers 40 of the engine unit 70 thereby producing better mixing of the fuel and air to this engine unit to improve its combustion efficiency. In order not to decrease the maximum power available from the engine 10, a valve 126 may be provided in the heater inlet passage 122 for shutting off the heater when the engine 10 is operated at the high end of its power range. Also no such heater is provided for the engine unit 72 so as to maximize the power available from this unit.

The valve 110 is intended to be moved from its full line position of FIG. 1 to its dot-and-dash line position when the power output of the engine 10 exceeds a predetermined value. This may be done manually or automatically in response to a condition of the engine indicative of its power output such as engine throttle valve position, intake manifold pressure, engine coolant temperature and/or engine rotative speed. For example, the intake manifold pressure for the engine unit 70 may be used for this purpose as shown in FIG. 1. As there illustrated, a pressure tap 130 is provided in the intake passage on manifold 92 downstream of its throttle valve 96. This pressure tap is connected by a conduit 132 to a pressure sensitive flexible diaphragm 134. The diaphragm 134 forms one side of a chamber 136 subject to the pressure at the manifold 92 via the pressure tap 130 and conduit 132. The other side of the diaphragm is subject to the surrounding atmospheric pressure and a compression spring 138 is provided in the chamber 136 for urging the diaphragm against atmospheric pressure.

The pressure diaphragm is connected to one arm of an electric switch 140 through a lost-motion connection schematically indicated by the spaced abutments 141. The switch 140 is connected to an electric circuit including a solenoid 142 and a source of electric power as, for example, a battery 144. The solenoid 142 is arranged to operate an arm 146 connected to the valve 110. A spring 148 is effective to urge the valve 110 towards its dot-and-dash line position of FIG. 1.

The arrangement of the pressure sensitive switch 140 is such that the spring 138 is effective to move the diaphragm to the left (as viewed in FIG. 1) to open the switch 140 when the below atmospheric pressure at the intake manifold tap 130 is above a predetermined value, that is, when the power output of the engine unit 70 is above a predetermined value. The spring 148 thereupon is effective to move the valve 110 to its dot-and-dash line position of FIG. 1. In this position of the valve 110, both engine units 70 and 72 are effective to deliver power for the engine 10. When, however, the throttle valve 96 is closed sufficiently to reduce the power output of the unit 70 below a predetermined value, the pressure at the tap 130 in the intake manifold 92 becomes sufficiently low (below atmosphere) for the diaphragm 134 to move to the right against the spring 138 to close the switch 140, as shown. The solenoid 142 is thereby energized to move the valve 110 to its full line position of FIG. 1 from its dot-and-dash line position. In this way, when the power output of the engine 10 is below a certain value, the valve 110 automatically assumes its full line position of FIG. 1 to shut down the engine unit 72. At the same time the valve thereby opens the intake port 82 for the engine unit 72 directly to the atmosphere whereby during this low power engine operation the engine unit 72 is effective to pump air into the engine exhaust. This extra air in the exhaust helps to burn any unburnt fuel remaining in the engine exhaust.

When the switch 140 closes to move the valve 110 to shut down the engine unit 72, the throttle valve 96 for the engine unit 70 will have to be opened somewhat to maintain the desired power output of the engine 10. In order to prevent the switch 140 from immediately re-opening because of the resulting increase in pressure at the tap 130, the lost-motion connection 141 has been provided so that the switch does not re-open until there has been a predetermined increase in the pressure at the tap 130, that is, until there has been a predetermined opening of the throttle valve 96.

As already noted, the heater 120 for the intake manifold 92 may be shut off at the higher powers when the engine unit 72 is also operating. The flexible diaphragm 134 and switch 140 may be used to control the heater 120 as well as the valve 110. For this purpose the valve 126 for the heater 120 is provided with a solenoid 150 such that when the solenoid 150 is energized the heater valve 126 is opened and when the solenoid 150 is deenergized, the heater valve is closed. The solenoid 150 is connected to the switch 140 and battery 144 in parallel with the solenoid 142. In this way when the solenoid 142 is energized to move the valve 110 to its full line position of FIG. 1 for shutting down the engine unit 72, the solenoid 150 is energized to open the valve 150. Thus when the engine unit 72 is shut down, the intake charge for the other engine unit 70 is preheated by the heater 120. At other times, that is when the engine unit 72 is also providing power, the heater 120 is shut off.

In the case of an engine for an automotive vehicle, it is known that when the vehicle is cruising on a level road that the engine power output is substantially less than one-half the maximum power output of the engine and may be as little as one quarter of said maximum output. Accordingly, at least for such applications, it is desirable that the engine unit 70 have substantially less volumetric displacement than that of the engine unit 72. Thus, as illustrated in FIG. 1, the working chambers 50 of the engine unit 72 are substantially wider and, therefore, are larger than the chambers 40 of the engine unit 70. With such an arrangement, when the vehicle powered by the engine 10 is cruising, it could be operating only on the power of the unit 70 and with the output of that unit being close to its maximum output. In this way, during cruising, the engine unit 70 would be operating close to its maximum efficiency and at the same time the engine unit 72 would be shut down.

In lieu of a two-unit engine with one of the engine units being larger than the other, it is within the scope of the invention to provide a multi-unit engine having more than two units with valves such as the valve 110 being arranged to close down two or more of these units when the engine is operated in a low power range.

Figure 4:
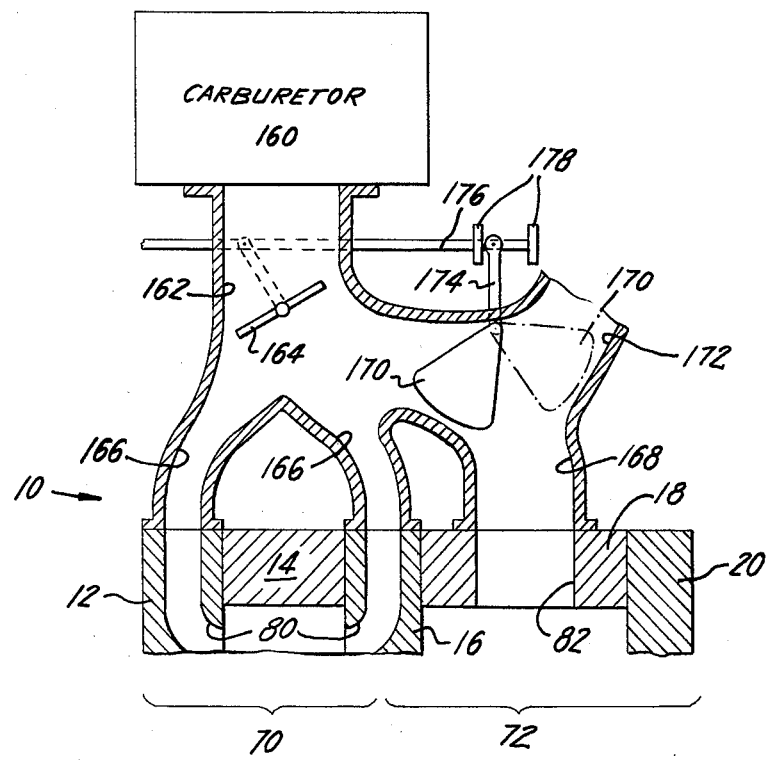
FIG. 4 is a partial view of a modified form of the invention.

As illustrated in FIG. 1, the throttle valves for the intake passages 92 and 100 of the two engine units 70 and 72 respectively are interconnected to a common throttle linkage 106. Accordingly, in lieu of separate intake passages, each with its own throttle valve, the two engine units 70 and 72 could be combined into a single intake passage and throttle valve. Such a modification is shown in FIG. 4. In FIG. 4 the engine housing and engine components within the housing are identical to that described in connection with FIG. 1. Accordingly, only a portion of this engine structure is shown in FIG. 4 and for convenience of understanding, the parts of this engine portion shown in FIG. 4 are identified by the same reference numerals as in FIG. 1.

In FIG. 4 the engine 10 is provided with a single carburetor 160 for supplying a fuel mixture to an intake passage 162 having a throttle valve 164. The intake passage 162 has two branches 166 leading to the side intake ports 80 for the engine unit 70 and a third branch 168 leading to peripheral intake port for the engine unit 72. A valve 170 (equivalent to the valve 110 of FIG. 1) is provided in the intake branch 168. As illustrated in FIG. 4, when the valve 170 is in its full line position, the branch passage 168 is closed to the carburetor 160 and, therefore, the engine unit 72 is shut down. At the same time, with the valve 170 in its full line position, a by-pass passage 172 is opened thereby opening the intake port 82 of the engine unit 72 directly to the atmosphere. When, however, the valve 170 is moved to its dot-and-dash line position of FIG. 1, the by-pass passage 172 is closed and the intake port 82 of the engine unit 72 is open to the intake passage 162.

It is evident, therefore, that the engine of FIG. 4 can operate in essentially the same manner as the engine of FIG. 1 and as in FIG. 1, the valve 170 could be controlled by intake manifold pressure in a manner similar to that of FIG. 1. Instead, however, in FIG. 4 an arm 174 connected to the valve 170 is connected to the throttle valve linkage 176 by a lost-motion connection 178. In this way the valve 170 is moved to its full line position when the throttle valve 164 is moved to its partially closed position of FIG. 4. By virtue of the lost-motion connection 178, the valve 170 is not moved to its dot-and-dash line position until the throttle valve 164 has been moved to a substantially wider open position. It is clear, therefore, that the operation of the valve 170 in FIG. 4 is essentially the same as the operation of the valve 110 in FIG. 1.

As in FIG. 1, a heater such as the heater 120 may be added to the modification of FIG. 4 for heating the intake charge supplied to the engine unit 70 through the two branch passages 166. Also, in lieu of operating the valve 170 in FIG. 4 from the throttle linkage 176, this valve could be operated in response to the intake pressure to the engine unit 70 as in FIG. 1. Likewise, it is obvious that the valve 110 of FIG. 1 instead of being controlled in response to intake manifold pressure, this valve could be connected to the throttle linkage 106 in a manner similar to the connection of the valve 170 to the throttle linkage 176 in FIG. 4.

The invention has been described in connection with a multi-unit rotary engine in which carburetor means has been provided to control the quantity of fuel supplied to the engine units. The invention, however, is equally applicable to multi-unit rotary engines in which, in lieu of a carburetor, a fuel injection apparatus is provided for controlling the supply of fuel to the engine intake manifolds. The invention can also be used with a multi-unit rotary engine having a high pressure fuel injection system. In such a rotary engine, the air inlet for the engine may contain no throttle valve, for example, as described in the U.S. Pat. No. 3,894,518 granted July 15, 1975 to Gavrun et al. If the invention is applied to a multi-unit rotary engine having such a fuel injection system with no air intake throttle valve, then there would be no need for the by-pass passage 112 or 172 of FIGS. 1 and 4 respectively.

While the invention has been described in detail in its presently preferred embodiments, it will be obvious to those skilled in the art, after understanding the invention, that various changes and modifications may be made therein without departing from the spirit and scope thereof. The appended claims are intended to cover such modifications.

What is claimed is:

1. A multi-unit rotary combustion engine comprising:
 (a) at least two co-axial engine units;
 (b) each engine unit including a housing having two axially-spaced side walls and a peripheral wall disposed between said side walls to form an internal cavity therebetween with the inner surface of said peripheral wall having a multi-lobe profile and said engine unit also including a rotor member having a generally polygonal periphery and mounted for rotation within said housing cavity with the apex portions of the rotor member periphery having sealing cooperation with said multi-lobe surface to form a plurality of engine working chambers;

(c) a common shaft for said engine units and extending through the housing cavities of said units, said shaft having a plurality of cylindrical eccentric portions, one for and disposed in each of said cavities with the rotor member for each cavity being journaled on the associated eccentric portion of said shaft;

(d) means for supplying fuel and air to the working chambers of each of said units, said means including an intake port for each unit and disposed for sequential communication with the working chambers of said unit, the intake port for at least one of said units opening into the engine cavity through a side wall of said housing and the intake port for at least another of said units opening into its engine cavity through the multi-lobe inner surface of its housing peripheral wall, said engine unit or units with a peripheral wall intake port having a larger total volumetric capacity of the working chambers than the total volumetric capacity of the working chambers of the engine unit or units having a side wall intake port; and (e) means for shutting off the fuel only to an engine unit or units having its/their intake port opening through the peripheral wall when the engine is being operated below a predetermined engine power output.

2. A multi-unit, rotary engine as recited in claim 1 in which the engine comprises two units.

3. A multi-unit, rotary engine as recited in claim 1 and including throttle valve means for controlling the charge supplied through the engine intake ports and including additional valve means associated with an engine unit to which the fuel is shut off below a predetermined power output, said additional valve means serving to cut off the intake port of said last-mentioned engine unit from its throttle valve means and to open its said intake port directly to the surrounding atmosphere.

4. A multi-unit, rotary engine as recited in claim 1 in which said fuel shut-off means for the engine units having a peripheral wall intake port is automatically responsive to a condition indicative of the power output of the engine.

5. A multi-unit, rotary engine as claimed in claim 1 and including throttle valve means for regulating the fuel and air charge supplied to the engine units and also including means operatively connecting said fuel shut-off means for the engine units having a peripheral wall intake port with said throttle valve means for shutting off the fuel to said peripheral intake port engine units when the extent to which said throttle valve means is open is less than a predetermined value.

6. A multi-unit, rotary engine as claimed in claim 1 and including means responsive to the intake pressure to the engine unit or units having a side wall intake port, said responsive means being operatively connected to said fuel shut-off means for shutting off the fuel to the engine unit or units having a peripheral wall intake port when said intake pressure is below a predetermined value.

7. A multi-unit, rotary engine as recited in claim 1 and including means for preheating the engine intake charge but only for the engine unit or units having a side intake port.

8. A multi-unit, rotary engine as recited in claim 7 in which said preheating means utilizes heat from the engine exhaust gases and including means for deactivating said preheating means above a predetermined engine power output.

9. A multi-unit, rotary combustion engine comprising:

(a) at least two co-axial engine units;

(b) each engine unit including a housing having two axially-spaced side walls and a peripheral wall disposed between said side walls to form an internal cavity therebetween with the inner surface of said peripheral wall having a multi-lobe profile and said engine unit also including a rotor member having a generally polygonal periphery and mounted for rotation within said housing cavity with the apex portions of the rotor member periphery having sealing cooperation with said multi-lobe surface to form a plurality of engine working chambers;

(c) a common shaft for said engine units and extending through the housing cavities of said units, said shaft having a plurality of cylindrical eccentric portions, one for and disposed in each of said cavities with the rotor member for each cavity being journaled on the associated eccentric portion of said shaft;

(d) means for supplying fuel and air to the working chambers of each of said units, said means including an intake port for each unit and disposed for sequential communication with the working chambers of said unit, the intake port for at least one of said units opening into the engine cavity through a side wall of said housing and the intake port for at least another of said units opening into its engine cavity through the multi-lobe inner surface of its housing peripheral wall;

(e) means for shutting off the fuel only to an engine unit or units having its/their intake port opening through the peripheral wall when the engine is being operated below a predetermined engine power output;

(f) means for preheating the engine intake charge but only for the engine unit or units having a side intake port in which said preheating means utilizes heat from the engine exhaust gases; and (g) means for deactivating said preheating means above a predetermined engine power output.

10. A multi-unit, rotary engine as recited in claim 9 in which the total volumetric capacity of the working chambers of the engine unit or units with a peripheral wall intake port is greater than the total volumetric capacity of the working chambers of the engine unit or units having a side wall intake port.

* * * * *